United States Patent Office 3,391,161
Patented July 2, 1968

3,391,161
LIQUID PHASE ALKYLATION OF THIOPHENE
Victor L. Larimer, Morristown, Tenn., assignor, by mesne assignments, to Ashland Oil and Refining Company, a corporation of Kentucky
No Drawing. Filed May 3, 1966, Ser. No. 547,165
6 Claims. (Cl. 260—332.2)

ABSTRACT OF THE DISCLOSURE

Alkylated thiophene compounds, suitable as low temperature lubricants and lubricating compound additives, are prepared by reacting thiophene with unsaturated fatty acids (e.g., oleic acid), or esters or dimers thereof, in the presence of a small amount of water and an acid-treated clay catalyst, at elevated temperatures and pressures.

---

This invention relates to the manufacture of alkylated thiophene compositions and more particularly to the production of such compositions which are highly suitable as low temperature lubricants and lubricant additives.

Various proposals have been made in the past for the alkylation of substituted and unsubstituted thiophenes. These methods have been, for the most part, directed toward the production of motor fuels and motor fuel additives, and have involved the use of olefins as the alkylating agent under conditions of temperature, pressure, and catalysts, so controlled that polymerization of the olefin is avoided (U.S. 2,448,211). Also, it has been disclosed that acyclic substituted thiophene compounds may be prepared by the vapor phase reaction of a thiophene with alkylating agents such as acyclic olefins, diolefins, alcohols, ethers, and esters such as the alkyl halides in the presence of an acid-reacting solid (U.S. 2,531,280). It has further been proposed to alkylate a wide variety of aromatic hydrocarbons, wherein benzene, substituted benzenes, toluene, xylenes, cymenes, and the like, are substantially purified of any thiophene content and then subjected to reaction with olefins, their polymers, ethers, alcohols, or esters, in the presence of catalysts, and in the vapor phase, the end products being described as useful as motor fuel components (U.S. 2,405,874).

According to the present invention, a notable advance has been made over the prior art, such as illustrated by the preceding description, and a process has been found which avoids the disadvantages of vapor phase operations, and whereby extreme low pour point and solid point materials may be obtained which are highly valuable as low temperature lubricants, lubricant additives, and chemical intermediates for plasticizer and emulsifier use. The end products of the process of this invention are, moreover, much lower in viscosity and pour point than any known sulfurized fatty products such as glycerides and sperm oil. The present process as compared with the prior art gives generally higher yields, more easily contolled reaction, easier product isolation, and new different products.

More specifically, according to this invention, it has been found that thiophene and unsaturated fatty acids or their derivatives can be reacted in a closed vessel for 1–15 hours in the presence of 0.0% to 5% by weight water and 0.1% to 10% by weight (based on fat) of an acid-treated clay catalyst, in the liquid phase, at a temperature of 100°–550° F., and under autogenous pressure, and in molar reactant ratios of 1:1 to 1:10 unsaturated fatty radical to thiophene to give high yields of alkylated thiophene. In certain embodiments of this invention, the products have low pour points and low solid points, as previously mentioned.

In the preferred practice of this invention, temperatures of 350°–500° F. are employed, with molar reactant ratios of 1:2 to 1:5 unsaturated fatty radical to thiophene, 3% to 7% by weight (based on fat) catalysts, 0.1% to 4% by weight water, and 5–9 hours of reaction time, the pressure being that autogenously developed in the closed vessel.

The unsaturated fatty acids which are useful in practicing the present invention include the mono- and poly-ethylenicaly unsaturated fatty acids containing from 6–26 carbon atoms in their monomeric form, such as those monomeric fatty acids found in naturally occurring fats and oils. Especially preferred are the $C_{16}$–$C_{22}$ unsaturated fatty acids. These fatty acids can be obtained from natural sources and contain from 1–4 ethylenic groups per molecule. Oleic acid is the preferred fatty acid. The dimer fatty acids can also be employed in this invention, i.e., those prepared by dimerizing the unsaturated fatty acids just described. Commonly, ethylenically unsaturated fatty acids are obtained from vegetable oils such as cottonseed oil, corn oil, soybean oil, safflower oil, rapeseed oil, linseed oil, and the like. These acids are ordinarily obtained as mixtures of acids which mixtures may contain a minor proportion of saturated acids. However, such mixtures can be used in practicing the present invention.

The esters which can be used are the $C_1$–$C_{26}$, e.g., $C_1$–$C_6$ monohydric and polyhydric alcohol esters of the previously mentioned fatty acids and dimer fatty acids. Alcohols which can be used to form these esters include saturated and ethylenically unsaturated alcohols such as methyl alcohol, n-hexanol, 2-ethyl hexanol, oleyl alcohol, glycerol, 1,2,6-hexanetriol, and the like. Esters of $C_1$–$C_4$ monohydric alcohols (e.g., methyl oleate or stearate) and the mono-, di-, and triglycerides (e.g. soybean oil) are particularly desirable. Mixtures of esters can also be used.

A particularly desirable procedure is to employ the fatty acid in an initial reaction with thiophene to prepare a crude product which is an adduct of the two reactants. The crude product is then treated with an alkanol to esterify the fatty acid. The esterified product can then be distilled to recover a purified thienyl-fatty acid ester in greater yield than otherwise. Preferably, the alkanols have 1–6 carbon atoms.

The acid-treated clay catalysts which can be used in practicing the invention are commercially available from the Filtrol Corporation and include such surface active clay minerals as montmorillonite, attapulgite, the bentonites, and the like, although acid-treated clays of the montmorillonite type are preferred.

The present invention is illustrated by the following examples, in which all parts and percentages are by weight.

Example 1

Six-hundred four parts of commercial oleic acid (Emersol 3308), 505 parts of thiophene, 34 parts of clay catalyst (Filtrol 78), and 17 parts of water were charged to a reaction vessel which was then purged with nitrogen and then sealed. The vessel and contents were heated for seven hours under autogenously developed pressure. During the first hour the temperature rose from 406° F. to about 450° F. and remained at 450°–455° F. for the remaining six hours. The pressure rose from 280 p.s.i. at the beginning of the reaction to 415 p.s.i. after seven hours of heating. This crude product had a pour point of −28° C. and a solid point of −57° C.

The crude was vacuum distilled at 28″ Hg with a pot temperature of 185°–350° C. and head temperature as high as 294° C. Approximately 65% by weight of the crude product distilled off overhead. This overhead product had a pour point of −2° C., a solid point of −55° C., and was found to be a 1:1 adduct of thiophene and oleic acid.

Example 2

The general procedure of example 1 was repeated, except that the crude product was treated with ethanol to esterify the acid group on the oleic acid portion of the product. The esterified crude product was distilled, approximately 65.5% by weight in the overhead and 34.5% by weight in the pot residue. A center cut of the overhead was analyzed for sulfur content, acid value, and saponification value, and subjected to vapor phase chromatography. The product was a mixture of ethyl(2-thienyl)-stearate and ethyl(3-thienyl)stearate of approximately 93-95% purity. This product had a pour point of —45° C. and a solid point of —55° C. Analyses gave the following results:

|  | Theoretical | Actual |
|---|---|---|
| Acid number | 0 | 0.53 |
| Saponification number | 142.2 | 141.5 |
| Molecular weight | 394.6 | 390. |
| Percent C | 73.04 | 73.49 |
| Percent H | 10.74 | 10.39 |
| Percent S | 8.13 | 7.99 |

The corresponding isopropylthienylstearate had a pour point of —28° C., and, by differential thermal analysis and thermogravimetric analysis, was found to have good stability in air at 215° C. with only a 10% weight loss at 258° C.

Example 3

Following the general procedure described in example 1, an adduct of thiophene and oleic acid was prepared as a crude product. A mixture was prepared containing 300 parts of the adduct, 127.5 parts of isobutanol, 4.5 parts of p-toluene-sulfonic acid, and 70.6 parts of toluene. This mixture was refluxed for six hours and forty-five minutes, during which time approximately 14 parts of water was removed and the acid value decreased to 3.27. This esterified product was stripped to remove the toluene solvent and distilled at 29.5" Hg with the distillate going overhead at a head temperature of 200°-238° C. The center cut of the distillate had a pour point of —41° C., an acid number of 8.15 (theoretical=0), and a saponification number of 135.5 (theoretical=135.5), indicating it to be isobutylthienylstearate.

It has been found, according to an important facet of this invention that when small quantities of the alkylated thiophenes of this invention are added to conventional lubricants a lowering of the coefficient of friction is noted and, as well, the load-carrying capacity of the lubricants is substantially improved. This lowering of the coefficient of friction and increase in load-carrying capacity is not limited to petroleum hydrocarbons but extends to hydraulic oils, cutting oils, metal working oils, gear oils, spindle oils, and the like, as well as straight mineral lubricating oils, blended oils, distillates from paraffiinic, naphthenic, or mixed base crudes, and the like. Similarly, the advantageous effects of the minerals of this invention may be obtained by their addition to synthetic lubricating oils or mixtures thereof with mineral oils.

Other additives such as wetting agents, viscosity index improvers, thickeners, pour point depressants, dyes, corrosion inhibitors, oxidation inhibitors, and detergent inhibitors, may also be incorporated in the lubricating media treated with the products of this invention if desired, e.g., nitrites, phosphates, sulfonates, phenothiazines, polymellacrylates, and the like.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A process for the production of alkylated thiophene compounds suitable as low temperature lubricants and lubricating compound additives which comprises reacting thiophene and a fat selected from the group consisting of unsaturated fatty acids, esters of unsaturated fatty acids, dimerized unsaturated fatty acids, and mixtures thereof, said fatty acids having 6 to 26 carbon atoms in their monomeric form and 1 to 4 ethylenically unsaturated double bonds in a closed vessel and in the liquid phase, for from 1–15 hours in the presence of 0.01% to 5% by weight water and 0.1% to 10% by weight (based on fat) acid-treated clay catalyst, at a temperature in the range of 100°–550° F. and autogenously developed pressure, in a molar reactant ratio of from 1:1 to 1:10 unsaturated fatty radical to thiophene and thereafter separating and recovering the resultant alkylated thiophene.

2. The process of claim 1 in which the temperature is in the range of 350°–500° F., the reaction time is in the range of 5–9 hours, the molar reactant ratios are in the range of 1:2 to 1:5, the catalyst is 3% to 7% by weight (based on fat), and water comprises 0.1% to 4% by weight of reactant charge.

3. The process of claim 1 in which the unsaturated fatty acid comprises oleic acid.

4. The process of claim 1 in which the unsaturated fatty acid comprises oleic acid and in which the temperature is in the range of 350°–500° F., the reaction time is in the range of 5–9 hours, the molar reactant ratios are in the range of 1:2 to 1:5, the catalyst concentration is 3% to 7% by weight (based on fat), and water concentration is 0.1% to 4% by weight of reactant charge.

5. The process of claim 1 wherein the reaction mixture, after the end of the reaction and before the separation and recovery steps, is esterified with an alkanol of 1–6 carbon atoms.

6. The process of claim 1 in which said fat comprises oleic acid.

References Cited

Gold farb et al.: Chem. Abs. vol 54; 19639, (1960).
Grey et al: Chem. Abs. vol. 54; 18466, (1960).
Belenkii et al.: Chem. Abs., vol. 56, 3435, (1962).

JOHN D. RANDOLPH, *Primary Examiner.*

WALTER A. MODANCE, N. S. MILESTONE,

*Examiners.*

C. M. SHURKO, *Assistant Examiner.*

UNITED STATES PATENT OFFICE
CERTIFICATE OF CORRECTION

Patent No. 3,391,161                                     July 2, 1968

Victor L. Larimer

It is certified that error appears in the above identified patent and that said Letters Patent are hereby corrected as shown below:

Column 1, line 59, before "different" insert -- and --; line 64, "0.0%" should read -- 0.01% --. Column 2, line 10, "polyethylenicaly" should read -- polyethylenically --. Column 3, lines 55 and 56, "hydraulic oils" should read -- hydraulic fluids --.

Signed and sealed this 13th day of January 1970.

(SEAL)

Attest:

Edward M. Fletcher, Jr.                       WILLIAM E. SCHUYLER, JR.

Attesting Officer                                 Commissioner of Patents